United States Patent [19]
Beig et al.

[11] 3,732,755
[45] May 15, 1973

[54] DIGITAL SHIFT CONTROL FOR VEHICULAR TRANSMISSION

[75] Inventors: Willi Beig, Waggershausen; Willi Kuhnle, Friedrichshagen; Herbert Seibold, Mariabrunn, all of Germany

[73] Assignee: Zahnradfabrik Friedrichshafen Aktiengesellschaft, Friedrichshafen, Germany

[22] Filed: Mar. 18, 1971

[21] Appl. No.: 125,633

[30] Foreign Application Priority Data

Mar. 19, 1970  Germany .................... P 20 13 079.4

[52] U.S. Cl. ................... 74/866, 74/336, 74/365, 74/752 A
[51] Int. Cl. ............................................. B60k 21/00
[58] Field of Search ..................... 74/866, 365, 336, 74/752 A, 752 D

[56] References Cited

UNITED STATES PATENTS

| | | | |
|---|---|---|---|
| 3,628,642 | 12/1971 | Rauenel | 74/866 |
| 3,448,640 | 6/1969 | Nelson | 74/752 A |
| 3,572,168 | 3/1971 | Shirai et al. | 74/752 A |
| 3,572,176 | 3/1971 | Bildat | 74/866 |
| 3,604,288 | 9/1971 | Mori | 74/866 |

Primary Examiner—C. J. Husar
Attorney—Karl F. Ross

[57] ABSTRACT

To change the speed ratio of an automatically shiftable power train by which the torque of an engine is transmitted to the traction wheels of a vehicle, a logic circuit emits commands to respective solenoid valves in response to a combination of operating parameters such as vehicle speed, engine temperature, accelerator position and road gradient. Speed is measured by a pulse generator, coupled with the output shaft of the transmission, whose pulses are counted by an accumulator that is periodically reset by a timing circuit and whose count between resettings is fed to the logic circuit together with signals indicating the position of a manual speed selector. The remaining parameters are used to modify the rhythm of the timer or the operation of a decoder inserted between the accumulator and the logic circuit.

7 Claims, 8 Drawing Figures

PATENTED MAY 15 1973
3,732,755
SHEET 1 OF 5

INVENTORS:
Willi Beig
Willi Kühnle
Herbert Seibold

ATTORNEY:
Karl J. Ross

INVENTORS:
Willi Beig
Willi Kühnle
Herbert Seibold

ATTORNEY:
Karl G. Ross

INVENTORS:
Willi Beig
Willi Kühnle
Herbert Seibold

ATTORNEY:
Karl G. Ross

DIGITAL SHIFT CONTROL FOR VEHICULAR TRANSMISSION

Our present invention relates to an automatic gear-shifting system, i.e. a system for changing the speed ratio of a power train in a transmission of an automotive vehicle in response to changes of one or more operating parameters such as vehicle speed, transmission or engine temperature, engine load (as detemined by the position of the vehicular accelerator or throttle) and the nature of the terrain.

Systems are known which evaluate combinations of several such parameters with the aid of hydraulic valves to operate associated gear-shift controls, generally in the form of hydraulic clutches and/or brakes for selectively entraining or arresting different elements of a planetary-gear coupling inserted between the engine and a driven shaft connected with the traction wheels of the vehicle. Reference may be made in this connection to commonly owned application Ser. No. 817,984 filed Apr. 21, 1969 by Hansjorg Dach, now U.S. Pat. No. 3,580,112.

If a larger number of parameters are to be taken into consideration, such hydraulic processors tend to become rather complicated. The object of our present invention, therefore, is to provide a shift-control system for the purpose set forth wherein the switchover points, i.e. the speed levels at which the system shifts to a higher or lower gear, can be conveniently altered in response to a variety of conditions.

This object is realized, pusuant to our present invention, by the provision of an electric pulse generator which is coupled to the driven shaft of the transmission to measure the vehicular speed by producing a train of rate pulses of a cadence proportional to that speed. An accumulator stage counts the number of rate pulses occurring within a certain period determined by an associated timing stage. The count of these rate pulses is fed to an actuating circuit which operates the conventional gear-shifting mechanism in response thereto, thus upon the attainment of a certain speed level by the accelerating or decelerating vehicle.

The processor which controls the gear-shift actuators, and which includes the aforementioned accumulator and timing stages, also comprises circuitry for modifying the response of the actuators to the count of the rate pulses under the control of ancillary information fed into it together with the rate pulses from the transmission-driven generator. This ancillary information, based upon one or more of the aforementioned parameters, may be utilized by the processor in several ways including a variation of the duration of a counting period established by the timing stage and/or an alteration of the mode of operation of a decoder which translates the count of the accumulator stage into a command for the gear-shift actuators.

For the purpose of varying the counting interval in response to one or more operating parameters other than vehicle speed, the timing stage may include a clock working into an adjustable frequency divider whose division ratio is controlled by the corresponding parameter sensor or sensors.

If the length of a counting period is variable, the timing stage may include a second clock measuring a series of invariable gating intervals which are substantially longer than the framing cycles determining the counting periods, with registration of the number of framing cycles per gating interval in a second accumulator stage; the count of these framing cycles per gating interval may then be used, according to another feature of our invention, as a corrective variable which jointly with the count of the rate pulses controls the operation of the gear-shift actuators.

With such a system the ancillary information arriving at the processor, partly in analog form, can be readily converted into binary signals to be utilized in a logic network for the control of the power stage of the gear-shifting mechanism.

The above and other features of our invention will be described in detail hereinafter with reference to the accompanying drawing in which.

Figure 1:
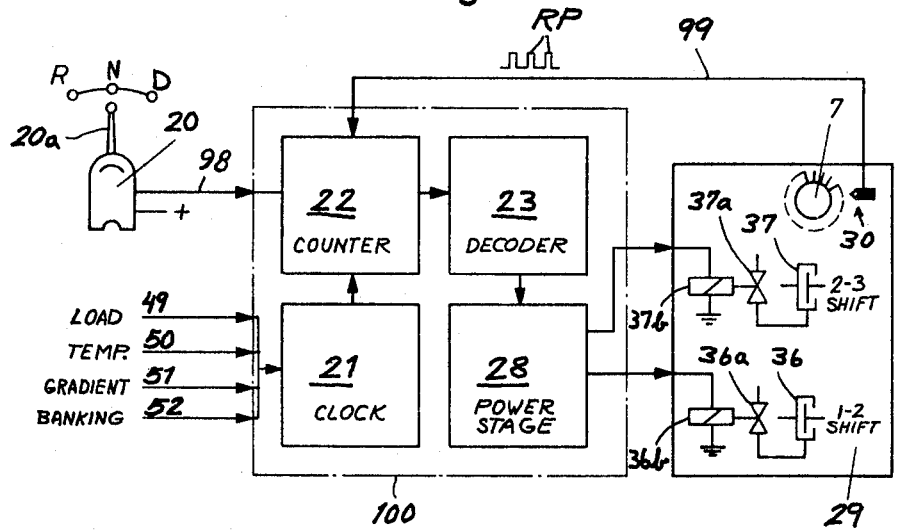
FIG. 1 is a block diagram of a relatively simple automatic gear-shifting system embodying our invention.

The system of FIG. 1 is designed for the control of an automatic transmission in an otherwise conventional automotive vehicle, not further illustrated, which includes a driver-operated selector 20 whose lever 20a in this simplified case has only three positions, namely N (neutral), D (drive) and R (reverse). For purposes of the present invention, only the forward position D is of interest; in neutral and reverse, the selector de-energizes the other elements shown in FIG. 1.

The vehicular transmission, generally designated 29, has an output shaft 7 which forms part of a pulse generator 30 with an output lead 99 terminating at the stepping input of a digital counter 22 in an accumulator stage of a processor generally designated 100. The processor is connected to selector 20 via a lead 98 and also receives, from external sources not shown in FIG. 1 but illustrated in FIG. 8 and described hereinafter, a combination of ancillary signals on several input leads 49, 50, 51 and 52. It may be assumed, for example, that lead 49 is energized by an analog voltage proportional to engine load, lead 50 carries a signal corresponding to the temperature of the engine and/or the transmission, lead 51 supplies an analog voltage proportional to the road gradient or slope (and of a polarity indicating ascending or descending terrain), and lead 52 provides information on transverse inclination (banking) of the roadway. Leads 49 – 52 jointly control the operating cycle of a clock 21 in a timing stage of the processor, the output of this clock resetting the counter 22 at the end of a period whose duration changes under the control of the various parameters just described.

The pulse generator 30 of FIG. 1 comprises (as more clearly shown in FIGS. 3 – 6) an electromagnetic pickup coil 30a juxtaposed with a pinwheel 30b of ferromagnetic material, each pin inducing a pulse in the output lead 99 upon moving past the coil 30a.

Generator 30 thus produces a train of rate pulses RP whose cadence varies with the speed of shaft 7; within a timing period or framing cycle established by clock 21, accumulator 22 counts a number of these rate pulses and delivers this count to a decoder 23 determining therefrom the instant when the transmission 29 is to be shifted. At such instant the decoder 23 trips a power stage 28 within the processor 100 to operate or deactivate the corresponding drive-establishing elements (clutches or brakes) here represented, diagrammatically, by a unit 36 for the 1 – 2 shift and a unit 37 for the 2 – 3 shift. Each of these units is shown to comprise a hydraulic valve 36ab 37a controlled by a solenoid 36b, 37b, respectively.

The operation of the system of FIG. 1 will now be described with reference to FIG. 2 where graph 2a shows the train of rate pulses RP delivered by the generator 30 of FIG. 1; graph 2b indicates a set of clock pulses CP generated by clock 21 to define framing cycles FC, whereas graph 2c shows the speed ratio 1/r of the transmission (with $r = 1$ for third gear). The pulses RP and CP are plotted in terms of voltage U against time $t$ while the transmission ratio 1/r is plotted against vehicular speed $n$ (in terms of RPM of shaft 7).

Figure 2:
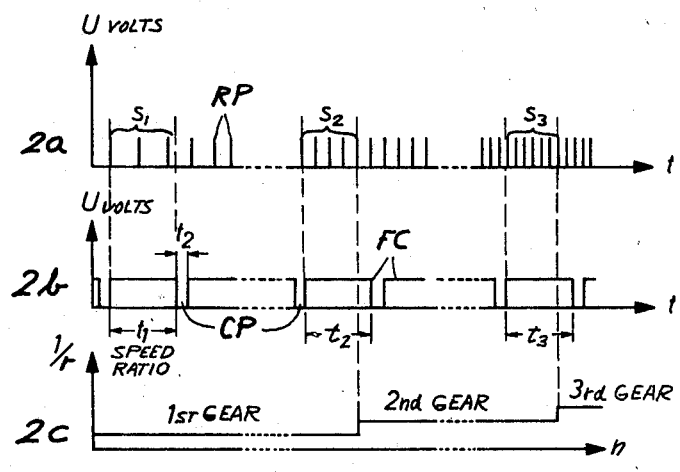
FIG. 2 is a set of graphs relating to the operation of the system of FIG. 1.

In FIG. 2 the rate pulses RP follow one another in progressively closer succession, indicating an acceleration of the vehicle. The framing cycles FC vary somewhat in duration, the intervening clock pulses CP serving to reset the counter 22. The first fully illustrated framing cycle, for length $t_1$, encompasses a relatively small number of rate pulses RP whose count $s_1$ is insufficient to shift the transmission 29 from first to second gear. A later framing cycle of length $t_2$ embraces a sufficient number of rate pulses RP to reach a count $s_2$ which trips the 1 – 2 gear shifter 36 of FIG. 1 so that the transmission now operates in second gear. Thereafter, a further framing cycle of duration $t_3$ measures a pulse count $s_3$ which trips the 2 – 3 gear shifter 37 to switch the transmission into third gear.

If the engine load increases, the signal on lead 49 reduces the length of the framing cycles FC so that the upshifting to second or third gear (as well as the downshifting to first and second gear) occurs at higher speeds $n$. A rise in temperature, as determined by the sensor connected to lead 50, has the opposite effect and advances the upshifting to reduce the speed of the transmission input shaft. During uphill driving, a voltage of one polarity on lead 51 shrinks the framing cycles to delaY the upshift; during downhill driving, the voltage of opposite polarity expands the framing cycles to advance the upshift or retard the downshift. If the roadway is banked, as when the vehicle drives through a curve, voltage on lead 52 again reduces the duration of the framing cycles to keep the vehicle speed down and to increase the available torque.

Figure 3:
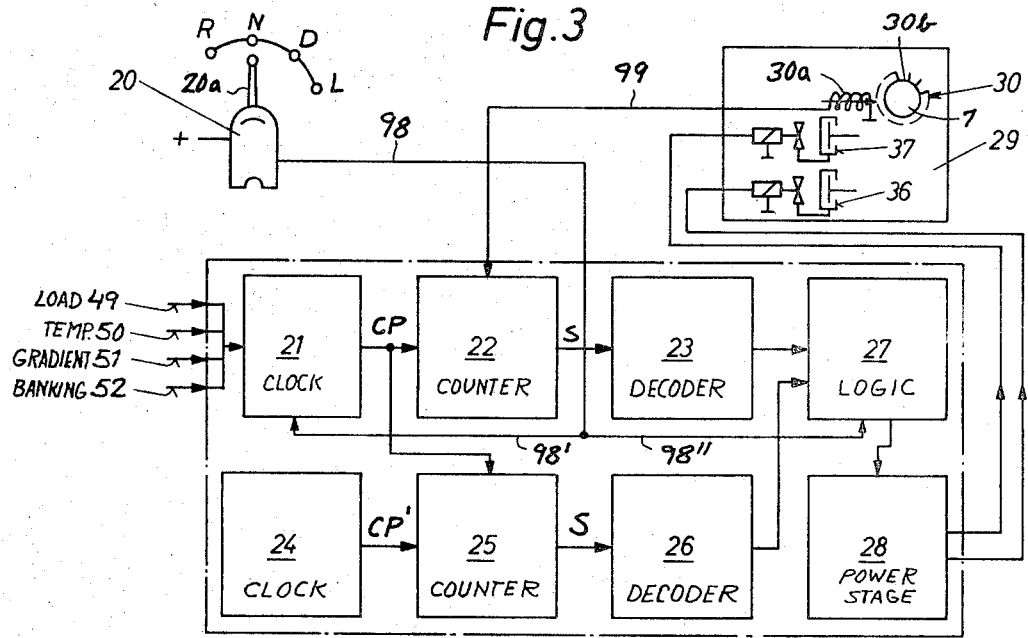
FIGS. 3, 4, 5 and 6 are block diagrams similar to FIG. 1 but representing four more sophisticated embodiments.

FIG. 3 shows a more elaborate system in which elements corresponding to those of FIG. 1 have been designated by the same reference numerals and which includes a second clock 24, another counter 25 which receives the clock pulses CP of timing stage 21 and is periodically reset by clock pulses CP' of timing stage 24, a second decoder 26 following the counter 25, and a logic network 27 connected to the outputs of decoders 23 and 26 in order to operate the power stage 28. Selector 20 is here shown to have a further forward position, L (low), which prevents an upshift into third gear and forces a downshift if the handle 20a is moved into that position while the transmission is in "high." The output lead 98 of the selector has a branch 98' extending to clock 21 and another branch 98" terminating at logic circuit 27 to modify the functioning of the latter in a manner more fully described below with reference to FIG. 8.

Figure 7:
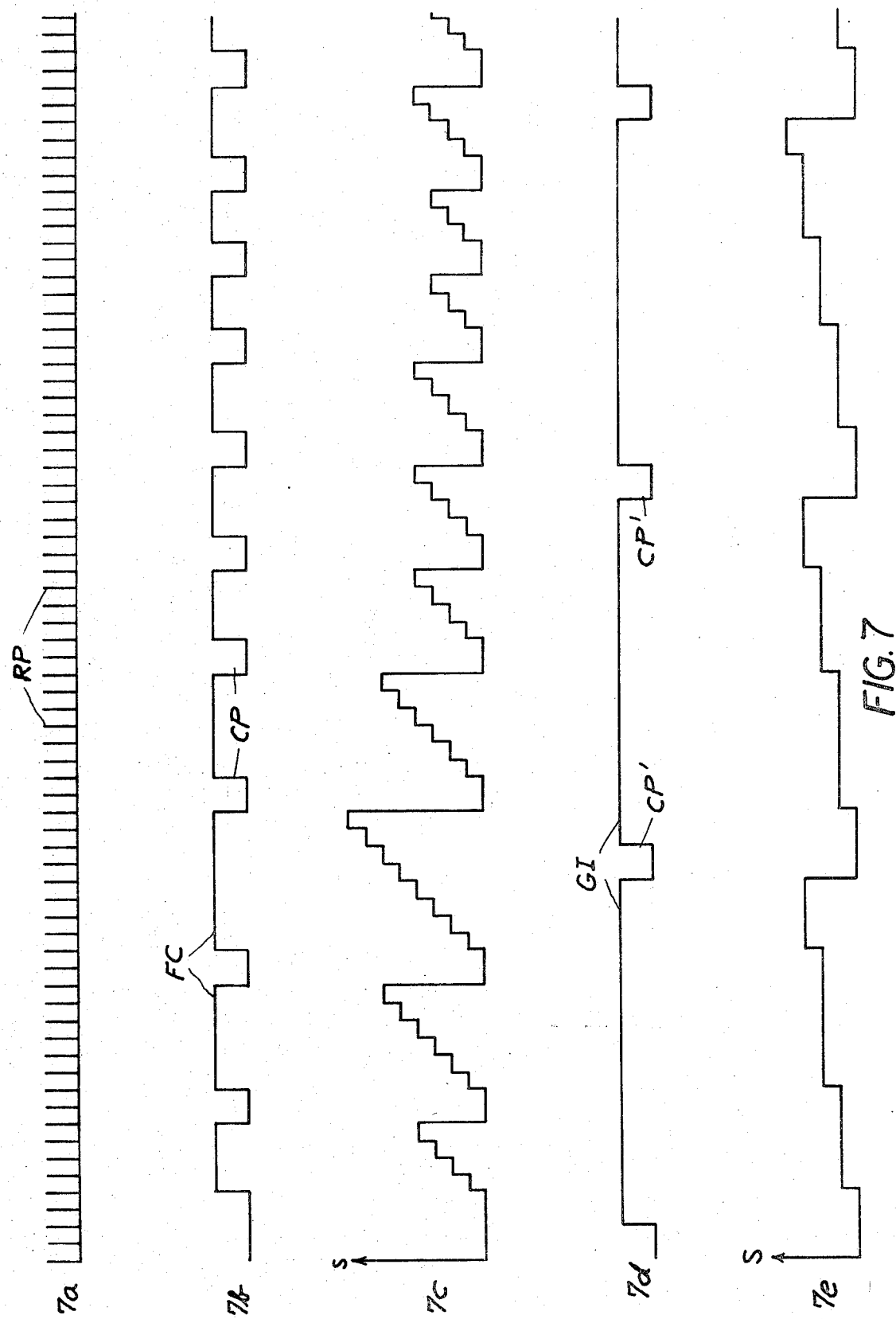
FIG. 7 is a set of graphs relating to the system of FIG. 3.

The operation of the system of FIG. 3 will be better understood from the diagram of FIG. 7. Graph 7a shows the rate pulses RP which, in the interest of simplicity, have been assumed to recur with constant frequency throughout the length of time considered. Graph 7b illustrates the framing cycles FC which are separated by clock pulses CP and during which the accumulator 22 generates a count $s$ as shown in graph 7c. Graph 7d depicts the clock pulses CP' emanating from timing stage 24, these pulses defining gating intervals GI of constant length substantially exceeding that of framing cycles FC. As shown in graph 7e, accumulator 25 counts the number of clock pulses CP' and therefore of framing cycles FC per gating interval GI, this number S being delivered to decoder 26 to codetermine the operation of logic circuit 27 jointly with the count $s$ from stage 22 supplied to decoder 23.

Figure 4:
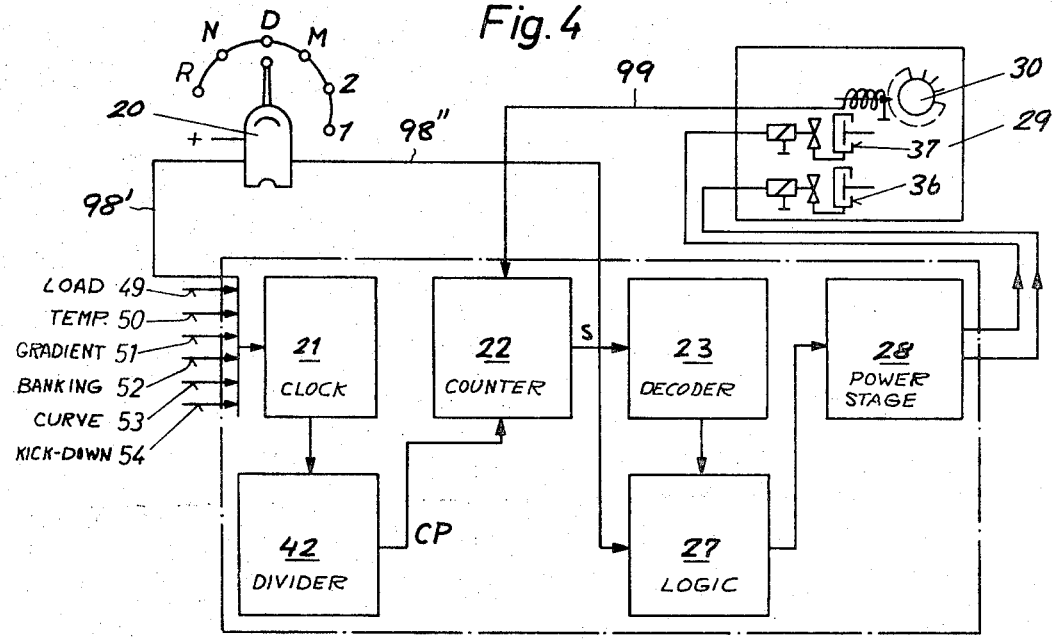

The system of FIG. 4 differs from that of FIG. 3 mainly by the provision of a frequency divider 42 inserted between clock 21 and counter 22, with the clock operating on a correspondingly increased frequency. Two more input leads 53 and 54 are shown working into clock circuit 21, lead 53 carrying a signal to indicate driving through a curve whereas lead 54 is energized upon the tripping of a so-called kick-down switch in a fully depressed position of the accelerator pedal. As is well known, and as has been described in the above-identified Dach U.S. Pat. No. 3,580,112, the kick-down switch serves to delay the upshifting from second to third gear and to transpose the downshift from third to second gear to a higher speed range.

In the selector 20 of FIG. 4, the "low" position L of FIG. 3 has been replaced by two positions "2" and "1" which serve to eliminate third and second gear, respectively. An additional position M, used for mountain driving and in sports cars, extends the ranges of first and second gear by assigning higher speed levels to the corresponding switchover points. The second clock 24, counter 25 and decoder 26, omitted in FIGS. 4 – 6, could also be included in these embodiments (cf. FIG. 8).

Figure 5:
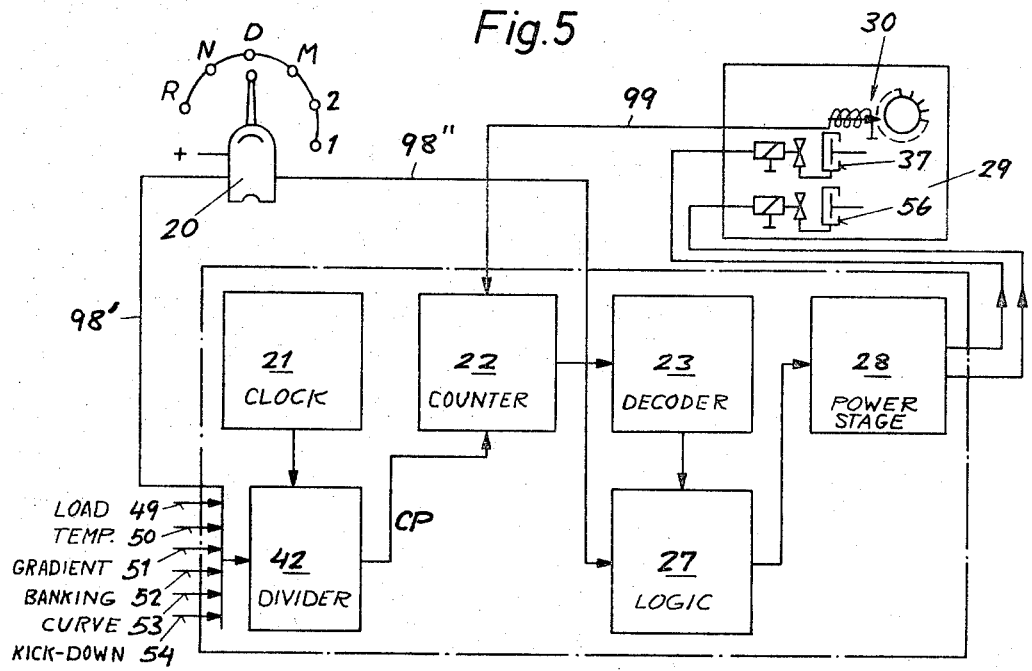

The modification of FIG. 5 comprises the same elements as the embodiment of FIG. 4, yet with the inputs 49 – 54 and 98' transferred from clock circuit 21 to the divider stage 42 to vary the cadence of the clock pulses CP.

Figure 6:
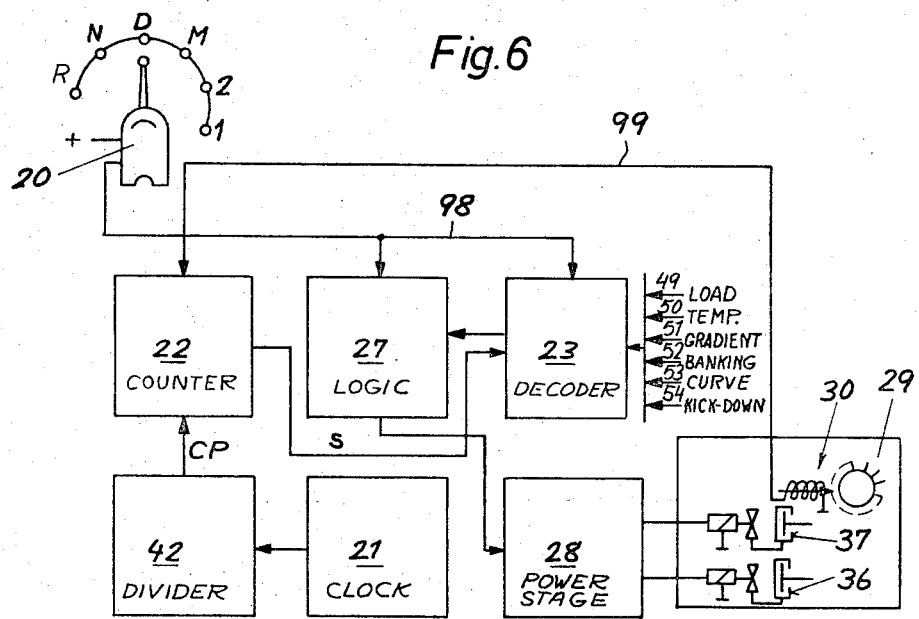

In FIG. 6 these inputs have all been relocated to the input side of decoder 23 to control the evaluation of the count $s$ rather than the cadence of the zero-setting pulses CP which in this case recur at a constant frequency.

Figure 8:
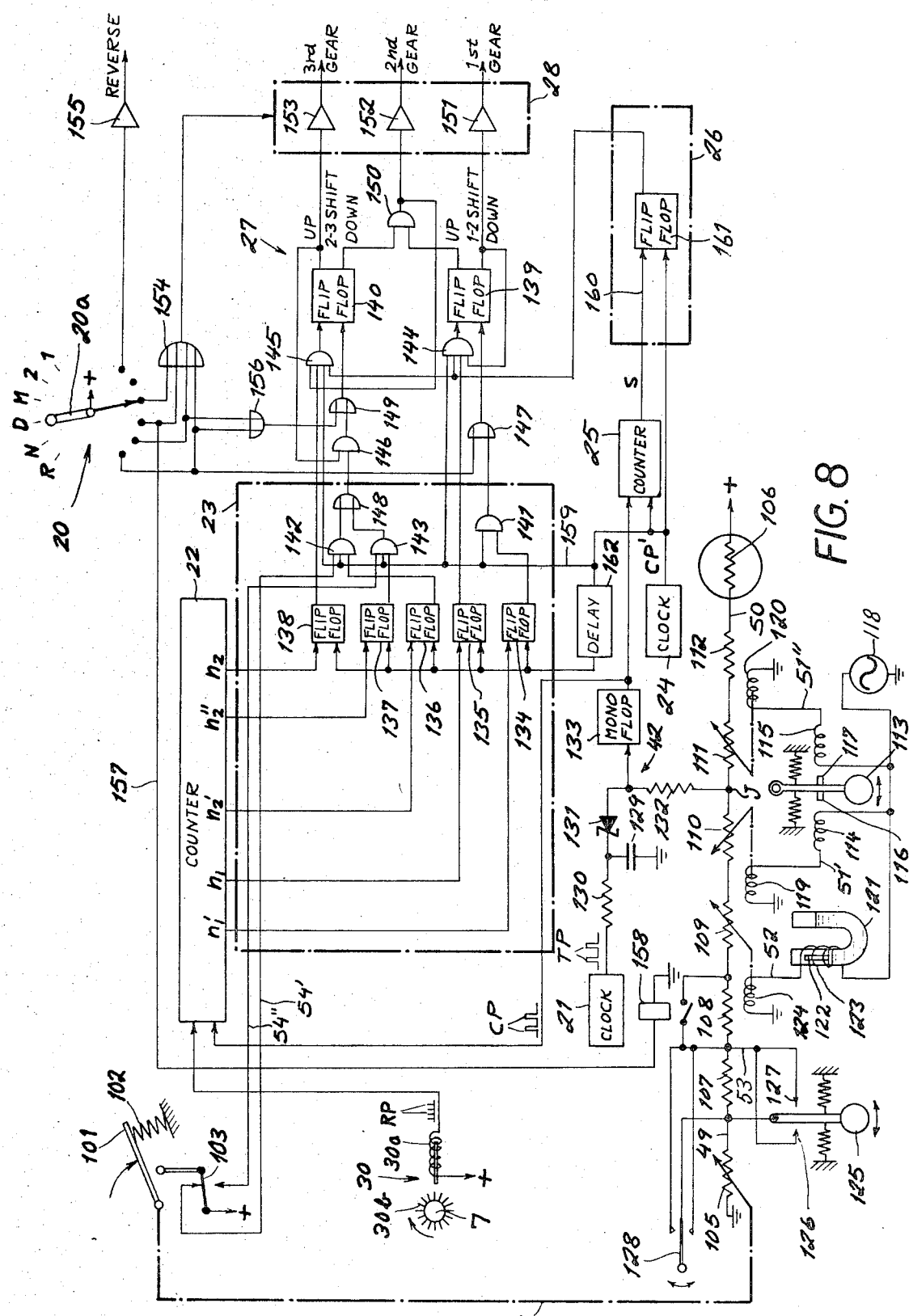
FIG. 8 is a more detailed circuit diagram of a system embodying features from preceding embodiments.

Reference will now be made to FIG. 8 for a detailed description of representative sensors for the various ancillary parameters discussed above, and of the circuits controlled thereby.

In FIG. 8 the handle 20a of selector 20 has the same six positions as in FIG. 6; an accelerator pedal 21, depressible against a spring 102, trips in its bottom position a kick-down switch 103 which normally energizes a lead 54' and in its tripped state energizes a lead 54" (the two leads together are the equivalent of lead 54 in FIGS. 4 – 6). Accelerator 101 also controls, via a linkage 104, a variable resistor 105 connected between negative battery potential (ground) and lead 49. Temperature is measured by a thermistor 106 (here of the negative type) connected between positive battery potential and lead 50. Resistor 105 and thermistor 106 form part of a voltage divider including further resistors 107, 108, 109, 110, 111, 112 in series therewith.

The road gradient is determined by a pendulum switch 113 vhich swings in the direction of travel and, upon displacement from its normal position against the force of a pair of centering springs, varies the inductivity of a respective coil 114 or 115 by altering its distance from a magnetic pole piece 116 or 117 whereby an alternating current from a source 118 is intensified or attenuated; a solenoid 119 in series with coil 114 or a solenoid 120 in series with coil 115 is thereby actuated to vary the magnitude of resistance 110 or 111, respectively. The pendulum switch 113 could also be utilized to detect acceleration or deceleration.

The banking of the roadway is sensed by a U-tube 121 which is filled with liquid and lies in a transverse plane of the vehicle; a float in one of the arms of the "U" supports a magnetic core 122 surrounded by a coil 123 which is energized from the a-c source 118 in series with a solenoid 124 to control the magnitude of resistance 109. With the core 122 normally centered in coil 123, an inclination of the vehicle to either side reduces the inductance of the coil and actuates the solenoid 124 to diminish the resistance 109 to a corresponding extent.

Another pendulum switch 125 swings in a transverse plane of the vehicle and engages either of two associated contacts 126, 127 to short-circuit the resistor 107 whenever the centrifugal force exerted thereon in a curve (and incompletely balanced by the banking of the roadway) exceeds the restraining force of its centering springs. Resistor 107 is also short-circuitable by the manual displacement of a switch 128 which is operated by the driver in the conventional manner to signal a turn to the left or to the right.

Leads 51' and 51", shown in FIG. 8 as extending from pendulum switch 113, are represented by the single lead 51 in FIGS. 1 and 3 – 6. The output leads of float switch 121 and pendulum switch 125 have been respectively designated 52 and 53, in conformity with the proceding Figures.

A tap on the voltage divider 105 – 112, specifically the junction J of its sections 110 and 111, is connected to the frequency divider 42 here shown as comprising a capacitor 129 connected via a charging resistor 130 to the output of clock 21 which delivers a train of timing pulses TP thereto. Capacitor 129 is connected to the aforementloned tap through a Zener diode 131 in series with a resistor 132, their junction being tied to the switching input of a monoflop 133 having its off-normal output connected to the resetting input of counter 22 and the stepping input of counter 25. The clock pulses CP appear on this monoflop output to start successive framing cycles FC (FIGS. 2 and 7) as described above.

The decoder 23 has been shown in FIG. 8 as including a set of flip-flops 134, 135, 136, 137 and 138 connected to respective stage outputs of counter 22, these stage outputs bearing (in ascending order) the designations $n_1'$, $n_1$, $n_2'$ $n_2''$ and $n_2$ which denote different speed levels as established by the count of rate pulses RP within a framing cycle FC. Since the length of such a framing cycle is variable under the control of the several parameters discussed above, in a manner more fully described hereinafter, only the relative values of these speed levels are significant. More particularly, speed level $n_1$ determines the upshift from first to second gear whereas speed level $n_2$ establishes the upshift from second to third gear; speed level $n_2'$ marks the downshift from third to second gear, while speed level $n_1'$ commands the downshift from second to first gear. Speed level $n_2''$ designates the point where the switchover from third to second gear occurs under kickdown conditions, the span $n_2 - n_2''$ being considerably smaller than the span $n_2 - n_2'$.

The relative offset between corresponding upshifting and downshifting points is designed to stabilize the system against excessive fluctuations, as pointed out in the above-identified Dach U.S. Pat. No. 3,580,112 patent.

The logic circuit 27 comprises a pair of further flip-flops 139, 140, the two networks 23 and 27 being interconnected by way of several AND gates 141–146 and OR gates 147–149 which could be considered included in either network and have been partly illustrated as components of decoder 23. A further AND gate 150, connected to the set output of flip-flop 139 and to the reset output of flip-flop 140, feeds an amplifier 152 in power stage 28 to bring about the establishment of the "second gear" driving mode; two further amplifiers 151 and 153 in that power stage are directly energized by the reset output of flip-flop 139 and the set output of flip-flop 140, respectively, for establishing the "first gear" and "third gear" modes. The portion of the power stage including amplifiers 151-153 receives current from the vehicular battery, via an OR gate 154, whenever selector lever 20a is in one of its four forward positions D, M, "2" or "1." In neutral (N) the power stage is de-activated, whereas in reverse (R) another amplifier 155 is energized to make the driven shaft 7 rotate in the opposite direction.

Flip-flop 139 1as its setting input connected to the output of AND gate 146 and has its resetting input connected to the output of AND gate 141 by way of OR gate 147 which is also energized from selector 20 in the "1" position of its handle so that flip-flop 139 cannot be set in that selector position and amplifier 151 remains active to the exclusion of amplifier 152. Flip-flop 140 has its setting input tied to the output of AND gate 145 and has its resetting input tied to the output of AND gate 146 through OR gate 149 which also receives operating voltage, via an OR gate 156, in positions "1" and "2" of the selector so that the flip-flop 140 cannot be set under these circumstances and amplifier 153 is also inoperative.

In selector positon M the handle 20a energizes a lead 157 to actuate a relay 158 which thereupon short-circuits the resistor 108 in the voltage divider 105-112.

AND gate 146 has one input connected to the set output of flip-flop 140 and has another input energizable from AND gate 142 or AND gate 143 via OR gate 148. AND gates 142 and 143 have inputs respectively connected to leads 54' and 54", AND gate 142 responding to a resetting of flip-flop 136 whereas AND gate 143 similarly responds to the resetting of flip-flop 137. AND gate 141 responds to the resetting of flip-flop 134. And gate 145 has an input directly connected to the output of AND gate 150. The reset output of flip-flop 139 is connected to one of the inputs of AND gate 144. Each AND gate 141–145 also has one input connected to a lead 159 extending from the output of clock 24. AND gates 144 and 145 each have an input connected to the set output of flip-flops 135 and 138, respectively.

Decoder 26 includes a flip-flop 161 which is settable by pulses s via a lead 160 upon energization of a stage of counter 25 and is periodically reset, together with that counter, by the pulses CP' from clock 24. The set output of flip-flop 161 is fed to further inputs of AND gates 144 and 145 which are thus inhibited if the flip-flop 161 is not set during a gating inverval GI (graph 7d), i.e. if the number of framing cycles FC (graph 7b) per gating interval is unduly reduced by a coincidence of conditions (e.g. small load, high temperature) which could result in premature upshifting.

The flip-flops 134-138 have their resetting inputs connected through a delay network 162 to lead 159 so as to be jointly reset shortly after the end of any gating interval GI. Monoflop 133 is tripped when the charge of condenser 129, i.e. the sum of timing pulses TP fed into it from clock 21, exceeds the breakdown potential of Zener diode 131 which is biased by voltage divider 105-112 through resistor 132. Thus, the magnitude of th biasing potential determines the frequency at which the monoflop is reversed to emit a clock pulse CP at the start of a new framing cycle. This frequency, therefore, rises if the junction J of the voltage divider is driven more negative and drops if it is driven more positive. If the load increases and accelerator pedal 101 is depressed, linkage 104 reduces the resistance 49 to let the monoflop 133 fire more frequently; this means a contraction of framing cycles FC so that all the switchover points $n_1'$, $n_1$ etc. are effectively raised in terms of actual vehicular speed inasmuch as rate pulses RP must follow one another more quickly to reach a given count within a shortened cycle. To the same effect is a short-circuiting of resistor 107 upon turning, a shorting of resistor 108 by relay 158 in selector position M, a diminution of resistance 109 during banking, and a reduction of resistance 110 on uphill driving. Conversely, a reduction of resistance 111 on downhill driving or of resistance 106 in response to higher transmission or engine temperatures increases the bias of Zener diode 131 and lengthens the charging period of capacitor 129, thereby extending the framing cycles FC and transporting the switchover points to lower vehicular speeds. With all the flip-flops 134-138 reset, AND gate 141 conducts whenever lead 159 is energized at the end of a framing cycle. This operation has no further effect since flip-flop 139 will be reset at such time. Amplifier 151 is operated to establish the highest torque ratio $r$ corresponding to first gear.

As the count reaches the stage $n_1'$, flip-flop 134 is set to block the AND gate 141 without any immediate effect. Upon further acceleration, stage $n_1$ is reached so that flip-flop 135 is set.

As long as counter 25 has not been loaded sufficiently to trip the flip-flop 161, AND gate 144 is blocked so that the setting of flip-flop 135 is ineffectual. With normal operation, however, flip-flop 161 will be reversed at some point in the ensuing gating interval so that, before the occurrence of the next pulse CP' at the end of that interval, all the inputs of AND gate 144 are energized whereby flip-flop 139 is tripped to initiate the 1-2 upshift, i.e. to activate the amplifier 152.

Upon further acceleration, the count reaches stage $n_2'$ with consequent setting of flip-flop 136 which is without significance at this time. The same applies to the subsequent setting of flip-flop 137 from the output of stage $n_2''$.

Finally, stage output $n_2$ is energized to switch the flip-flop 138 whereby, with AND gate 150 conductive at this time, AND gate 145 sets the flip-flop 140 in the presence of the next clock pulse CP' if the decoder 26 permits this operation. The system is now operating in third gear.

Upon subsequent deceleration, and with kick-down switch 103 in its illustrated normal position, flip-flop 140 cannot be reset as long as AND gate 142 is blocked by the prior setting of flip-flop 136 during the same gating interval, i.e. while the speed equals or exceeds the level $n_2'$. When the speed drops below that level, AND gate 142 responds to the next pulse CP' and, via gates 148, 146 and 149, resets the flip-flop 140 for a downshift to second gear.

If a further slowdown takes the speed below level $n_1'$, flip-flop 134 remains reset throughout the following gating interval GI so that the next clock pulse CP' resets the flip-flop 139 by way of gates 141 and 147. The transmission has now returned to first gear.

In the foregoing description it has been assumed that selector lever 20a is in its illustrated position D or, possibly, in the adjacent position M. If, from either of these positions, it is moved to position "2" or "1," flip-flop 140 in the former case and both flio-flops 139 and 140 in the latter case would be promptly reset (if previously set) so that the system would return to the corresponding lower transmission ratio.

If, with flip-flops 139 and 140 set to establish the "third gear" driving mode, the operator depresses the pedal 101 sufficiently to reverse the kick-down switch 103, AND gate 142 is blocked whereas AND gate 143 is enabled to respond to a resetting of flip-flop 137 at speeds below level $n_2''$ to reset the flip-flop 140 for the 2-3 downshift which therefore occurs at a higher speed level.

It will thus be apparent that the operation of the control system in response to the rate pulses RP can be modified (a) by directly or indirectly altering the cadence of clock pulses CP, as generally shown in FIGS. 1 and 3 - 5 and as illustrated more specifically in FIG. 8 for the sensors associated with voltage divider 105 - 112, and/or (b) by intervening directly in the logic of the decoder, as broadly shown in FIG. 6 and as specifically illustrated in FIG. 8 for the kick-down circuit 54', 54''.

The various switches shown in FIG. 8, though illustrated as relatively movable contacts, may be of the contactless type and may be combined with other circuit elements in an integrated solid-state or hybrid-type module. Analog values, such as those supplied by sensors 106, 113 and 121, could also be digitized.

We claim:

1. In an automotive vehicle having an engine, a driven shaft, a transmission of variable speed ratio coupling said engine to said driven shaft, fuel-control means for said engine and shift means for varying said speed ratio, the combination therewith of:

electric pulse-generating means coupled with said driven shaft for emitting a train of rate pulses at a cadence proportional to the speed of said shaft;

sensing means responsive to an operating parameter affecting the optimum operating point of said shift means;

signal-generating means controlled by said sensing means to produce an output related to said operating parameter;

a processor having an input stage connected to said signal-generating means;

accumulator means in said processor coupled to said pulse-generating means for counting said rate pulses;

timing means in said processor connected to said accumulator means for resetting same at the end of a recurrent counting period;

actuating means for said shift means controlled by said processor in response to a predetermined count of said rate pulses indicative of shaft speed; and modifying circuitry in said timing means responsive to said output for altering the duration of said counting period, thereby varying the shaft speed corresponding to said predetermined count.

2. The combination defined in claim 1 wherein said timing means comprises a first clock controlled by said modifying circuitry for generating a succession of framing cycles of variable length, defining said counting period, and a second clock measuring a series of invariable gating intervals substantially longer than said framing cycles, said processor including a second accumulator for registering the number of framing cycles per gating interval, said actuating means being jointly controlled by said accumulators to operate said shift means at an instant codetermined by said count and said number.

3. The combination defined in claim 2 wherein said timing means comprises a source of clock pulses and frequency-dividing means connected to said source for deriving from said clock pulses a succession of lower-cadence framing pulses of a length defining said counting period.

4. The combination defined in claim 4 wherein said modifying circuitry is connected to said frequency-dividing means for varying the step-down ratio thereof.

5. The combination defined in claim 1, further comprising a manual speed-ratio selector with a plurality of operating positions and circuit means extending from said selector to said processor for blocking the response of said actuating means to said count in certain of said operating positions.

6. The combination defined in claim 1 wherein said pulse-generating means comprises a ferromagnetic pinwheel on said driven shaft and inductive pickup means adjacent said pinwheel.

7. The combination defined in claim 1 wherein said modifying circuitry comprises a logic network.

* * * * *